Figure 1:
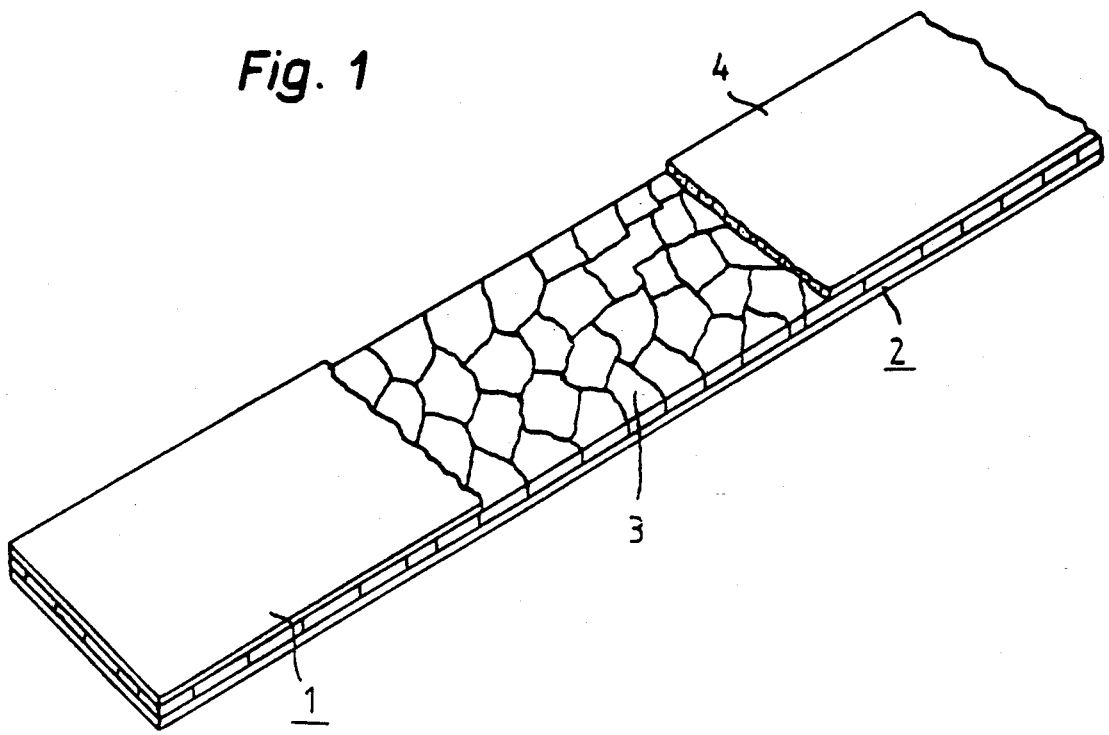

United States Patent [19]

Ihlein et al.

[11] Patent Number: 5,158,826
[45] Date of Patent: Oct. 27, 1992

[54] INSULATING TAPE FOR MANUFACTURING AN INSULATING SLEEVE, IMPREGNATED WITH A HOT-CURING EPOXY-RESIN ACID-ANHYDRIDE SYSTEM, FOR ELECTRICAL CONDUCTORS

[75] Inventors: Walter Ihlein; Franz-Josef Pollmeier, both of Berlin; Wolfgang Rogler, Mohrendorf, all of Fed. Rep. of Germany

[73] Assignee: Siemens Aktiengesellschaft, Berlin & Munich, Fed. Rep. of Germany

[21] Appl. No.: 602,328

[22] PCT Filed: Nov. 28, 1988

[86] PCT No.: PCT/DE88/00742

§ 371 Date: Nov. 29, 1990

§ 102(e) Date: Nov. 29, 1990

[87] PCT Pub. No.: WO90/00802

PCT Pub. Date: Jan. 25, 1990

[30] Foreign Application Priority Data

Jul. 14, 1988 [DE] Fed. Rep. of Germany ....... 3824254

[51] Int. Cl.$^5$ ............................................. C09J 163/02
[52] U.S. Cl. ................................... 428/324; 428/355; 428/413; 428/454
[58] Field of Search ............... 428/413, 454, 324, 355, 428/363; 528/407; 525/524

[56] References Cited

U.S. PATENT DOCUMENTS

| | | | |
|---|---|---|---|
| 3,458,389 | 7/1969 | Mertens | 428/324 |
| 3,539,438 | 11/1970 | Groff | 428/324 |
| 3,556,925 | 1/1971 | Mertens | 428/324 |
| 3,759,866 | 9/1973 | Rogers | 525/524 |
| 3,839,281 | 10/1974 | Dreher | 525/524 |
| 3,983,289 | 9/1976 | Nishizaki | 428/324 |
| 3,998,983 | 12/1976 | Smith | 428/324 |
| 4,085,250 | 4/1978 | Smith | 428/324 |
| 4,248,920 | 2/1981 | Yoshizumi | 428/413 |
| 4,265,966 | 5/1981 | Schuh | 428/324 |
| 4,336,302 | 6/1982 | Ihlein | 428/324 |
| 4,356,417 | 10/1982 | Smith | 428/324 |
| 4,389,520 | 6/1983 | Gannon | 528/89 |
| 4,427,740 | 6/1984 | Stackhouse et al. | 428/324 |
| 4,585,698 | 4/1986 | Anzai | 428/413 |
| 4,910,269 | 3/1990 | Waddill | 528/407 |
| 5,032,453 | 7/1991 | Rogler | 428/324 |

FOREIGN PATENT DOCUMENTS

| | | |
|---|---|---|
| 073736 | 3/1983 | European Pat. Off. . |
| 099334 | 1/1984 | European Pat. Off. . |
| 149971 | 11/1984 | European Pat. Off. . |
| 132748 | 2/1985 | European Pat. Off. . |
| 2142571 | 12/1972 | Fed. Rep. of Germany . |
| 2916954 | 10/1979 | Fed. Rep. of Germany . |
| 3003477 | 7/1981 | Fed. Rep. of Germany . |
| 367885 | 10/1974 | Sweden . |
| 538179 | 6/1973 | Switzerland . |
| 2077271 | 12/1981 | United Kingdom . |

Primary Examiner—Jenna L. Davis
Attorney, Agent, or Firm—Kenyon & Kenyon

[57] ABSTRACT

An insulating tape for manufacturing an insulating sleeve, impregnated with a hot-curing epoxy-resin acid-anhydride system, for electrical conductors.

The insulating tape for manufacturing an insulating sleeve, impregnated with a hot-curing epoxy resin-hardener system, consists of an inorganic material, of high dielectric strength which is applied to a flexible support and is bonded by means of a binder and contains an accelerator which promotes the curing reaction, whereby the binder/accelerator mixture constitutes a system that is self-curing at the curing temperature of the impregnating resin.

In the case of the binder/accelerator mixture, the binder consists of a physiologically innocuous, ring-epoxidized, cycloaliphatic epoxy resin, modified by molecular enhancement, with an epoxide equivalent greater than 200, and the accelerator adducts of piperazines, substituted in 1 position, with (meth)acrylate compounds.

Such an insulating tape (1) can be stored indefinitely at ambient temperature and insulating sleeves (5) of electrical conductors (6) manufactured with it can be cured after being impregnated with epoxy resin/acid-anhydride-systems in economically short times and possess excellent rigidity and a high heat-distortion temperature.

13 Claims, 2 Drawing Sheets

INSULATING TAPE FOR MANUFACTURING AN INSULATING SLEEVE, IMPREGNATED WITH A HOT-CURING EPOXY-RESIN ACID-ANHYDRIDE SYSTEM, FOR ELECTRICAL CONDUCTORS

The invention relates to an insulating tape for manufacturing an insulating sleeve impregnated with a hot-curing epoxy-resin/acid-anhydride-system, for electrical conductors, especially for bars or coils of electrical machines, consisting of a flat, inorganic material of high dielectric strength, such as mica splittings or mica flakes, deposited on a flexible support. This material is bonded to the support and to other sections of the material and optionally to a facing by means of a binder containing an accelerator which promotes the curing reaction of the impregnating resin. The binder/accelerator mixture forms a system that is self-curing at the curing temperature of the impregnating resin.

Such an insulating tape, as known from the German Patent 21 42 571, makes it possible to perform the impregnation process economically, because a non-reactive impregnating resin can be used. This non-reactive impregnating resin does not undergo any change in viscosity, even at the high impregnating temperatures which are required to thoroughly impregnate the insulating sleeve. This is necessary, because only a small portion of the epoxy-resin/acid-anhydride system used as impregnating resin penetrates into the insulating sleeve, while the residue must be used again for new impregnation procedures. For this reason, the insulating tape contains an accelerator which promotes the curing reaction of the impregnating resin, so that the portion of impregnating resin that has penetrated into the insulating sleeve cures within an economically short time.

To be able to store insulating tapes for a long time before the impregnation process, the binder/accelerator mixture is selected, in the case of the known insulating tape, so that there is virtually no curing of this system at room temperature. In addition, the binder/accelerator mixture forms a self-curing system, which cures only at the curing temperatures of the impregnating resin which lie considerably above ambient temperatures. So the binder, which has penetrated between large-surfaces of inorganic material of high dielectric strength and has not been completely absorbed by the impregnating resin, does not remain in an uncured state in the insulation.

In the case of the known insulating tape, cycloaliphatic epoxy resins with an epoxide-equivalent lower than 180 are used as binders, whereby the epoxy groups are the result of the addition of oxygen on double bonds in ring position. As is generally known, these cycloaliphatic epoxy resins do not show any reaction with amine hardeners, or show a much delayed reaction with accelerators. However, when the epoxy-resin/acid-anhydride impregnating system is added, these accelerators develop their full catalytic activity. As accelerators, the known insulating tape contains adducts from vinylcyclohexanedioxide and secondary amines of the molar ratio 1:1, where the secondary nitrogen atom is a part of a hydrogenated ring system, and adducts of the molar ratio 1:1 of vinylcyclohexanedioxide and, in the 1 position, unsubstituted imidazoles.

Recent investigations have shown, however, that vinylcyclohexanedioxide (4-vinyl-1.2. cyclohexanediepoxide) is a harmful substance, because it has been carcinogenic in tests on laboratory animals.

According to the manufacturer, the same judgment is valuable for cycloaliphatic epoxy resin 3(3',4'-epoxycyclohexyl)-7.8-epoxy 2.4-dioxa-spirobicyclo-[5.5]-undecane (epoxide equivalent approx. 162).

The object of the invention is therefore to find a binder/accelerator mixture for insulating tapes of the type described in the beginning, which is physiologically innocuous, according to all tests known to date.

Furthermore, insulating substances are known from DE-A-29 16 954, which consist of an epoxy resin modified by molecular enhancement with an epoxide equivalent of over 200 and an inorganic, powdery filler, such as mica. In addition, these insulating substances contain acid-anhydride hardeners as well as amines as accelerators, such as N-aminoethylpiperazine. The known insulating substance is cast for embedding semiconductor parts or processed using injection molding technology.

Furthermore, it is known from the EP-A-149 971, to use insulating substances to coat electrical conductors on the basis of ring-epoxidized, cyloaliphatic epoxy resin modified by molecular enhancements.

To solve this problem, according to the invention, a physiologically innocuous, ring-epoxidized, cycloaliphatic epoxy resin, modified by molecular enhancement, to an epoxide equivalent greater than 200 is used as a binder and adducts of piperazines, substituted in 1-position, and (meth)acrylate compounds are used as accelerators in the insulating tape of the type described in the beginning.

An insulating tape manufactured according to the invention can be stored at ambient temperatures for more than three months without any changes in its properties. On the other hand, these piperazine adducts used as accelerators effect that the gelation of an epoxy-resin/acid-anhydride system is activated and accelerated already at temperatures of about 60° C. Therefore, it is possible to cure that portion of the impregnating resin which has penetrated into the insulating sleeve in economically short times. Besides the high reactivity to the penetrating impregnating resin, and the low reactivity to the binder, an important advantage of the accelerator system added to the binder according to the invention is an extremely low vapor pressure up to 80° C. Thus, under the conditions of VPI technology (vacuum pressure impregnation), there is no danger of contaminating the hot-curing epoxy-resin/acid-anhydride system by vapors from components of the binder-accelerator mixture which may have an accelerating and activating effect.

Before the insulations are impregnated, the binder-accelerator mixture remains, completely soluble in the impregnating resin under the drying and preheating conditions of the insulating sleeves wound by using the insulating tapes, without showing any decrease in reactivity to the impregnating resin penetrating into the insulating sleeve during the impregnation process.

Due to the reactivity of the accelerator, it is recommended to prefer the reaction product of 1 mole trimethylolpropanetriacrylate and 3 mole of a piperazine substituted in 1 position, such as 1-methylpiperazine or 1-ethylpiperazine.

In the case of the insulating tape manufactured according to the invention, ring-epoxidized, cycloaliphatic epoxy resins, modified by molecular enhancement to an epoxide equivalent greater than 200 on the basis of 3.4-epoxycyclohexylmethyl -(3.4 epoxy) cyclohexanecarboxylate or bis(3.4-epoxycyclohexylmethyl)adipate can be used as binders. However, it is absolutely necessary to modify these two resins, because without molecular enhancement the viscosity of about 350 m Pas/25° C. (epoxide-equivalent 140), and the viscosity of about 700 m Pas/25° C. (epoxide-equivalent 208), are too low, therefore, these resins would not have sufficient adhesive strength for manufacturing a workable, laminated tape. To attain compounds with higher viscosity by means of molecular enhancement, the following three known processes are preferred:

a) ionic polymerization with the aid of an appropriate accelerator;

b) the addition of anhydrides in minor amount, whereby the molecular enhancement takes place by formation of ester groups;

c) the addition of particularly aromatic diols with the formation of aryl-ether structures (advancement process).

Reaction products with bisphenol A are the advantageous binders for the insulating tapes according to the invention. They are prepared according to method c), and of these especially the addition products of an epoxide equivalent of about 250 for 3.4 epoxycyclohexylmethyl- 3.4 epoxycyclohexanecarboxylate and of about 500 for bis(3.4 epoxycyclohexylmethyl)adipate show excellent adhesive strength because of their high viscosity.

Quaternary ammonium salts, quaternary phosphonium salts, organic phosphines, etc., are used as catalysts in this reaction. These accelerators are well known from the advancement process. Examples of these types of catalyst systems are described, inter alia, in the European Patent 0 099 334 and the U.S. Pat. No. 4,389,520. In the present case, compounds such as benzyltriethyl ammonium chloride and benzyldimethyltetradecyl ammonium chloride have proved.

In the manufacturing of the insulating tape, it is recommended not to use a too high amount of binder so that the impregnating resin can penetrate easily during impregnation into the porous tape. The percentage by weight of the resins used as binders in the insulating tape can therefore be more or less between 3 and 20%, relative to the total weight of the insulating tape. In this case, the amount of accelerator can be about 0.05 to 3%, regard of the total weight of the insulating tape. The amount of accelerator added to the insulating tape in manufacturing depends on the amount of inorganic material, e.g. mica and also of the amount of binder which is used as an adhesive in the insulating tape.

A further improvement of the insulations, which show a high degree of stiffness and are manufactured of the insulating tapes according to the invention, is possible in that the binder/accelerator mixture contains admixtures acting as hardeners, which only become effective at the curing temperatures of the hot-curing epoxy-resin/acid-anhydride system. As a result, the heat distortion temperature of the self-curing binder is increased further. However, these admixtures do not adversely affect the storage stability of the insulating tape. This binder/accelerator mixture with admixtures also remains, before the insulations are impregnated, completely soluble in the impregnating resin under the drying and preheating conditions.

Preferred are admixtures, which act as hardeners and which are insoluble in the binder up to 80° C. and have, relative to the curing temperature, a sufficiently high melting point, such as the 2-phenyl-4.5 dihydroymethylimidazole. These types of admixtures show their activity at the curing temperatures, while the gelation of the impregnating resin penetrating into the insulating sleeve is promoted at temperatures of about 60° C. by the piperazine- trimethylolpropanetriacrylate adduct which is also present in the binder.

Suitable as admixtures are also complex compounds or adducts, which decompose not before the curing temperatures into active curing agents. These are compounds as described in the German Published Patent Application 28 11 764, or salts of the trimellitic acid with imidazoles, such as 1-cyanoethyl-2 -methylimidazole-trimellitate.

Encapsulated curing systems or curing systems absorbed on substances with a large active surface are also suited for use as admixtures. These curing systems are released and become active only at the curing temperature or only when exchanged by other compounds. For example, tertiary amines, which have been absorbed in molecular sieves can be used. The amount of these curing agents admixed with the binder depends on their specific effectiveness and should be within the range of 0.05 to 10% by weight, relative to the binder.

In the following, the characteristics of insulating tapes manufactured according to the invention shall be explained in greater detail based on Tables 1 to 4: Table 1 shows for three different mixture ratios respectively, the technical data of the binders prepared of the reaction products of bisphenol A and the corresponding ring-epoxidized epoxy resins, whereby in column 1 [A and B] signify A=3.4 epoxycyclohexylmethyl-3.4 epoxycyclohexanecorboxylate B=Bis(3.4-epoxycyclohexylmethyl)adipate.

TABLE 1

| Epoxy resin | Parts by weight bisphenol A to 100 parts by weight epoxy resin | Viscosity (mPas) of the reaction product at 70° C. | Epoxide number of reaction product | Symbol of reaction product |
|---|---|---|---|---|
| A | 21 | approx. 5,000 | 0.43 | $A_1$ |
|   | 23 | approx. 10,000 | 0.40 | $A_2$ |
|   | 25 | approx. 18,000 | 0.38 | $A_3$ |
| B | 19 | approx. 4,000 | 0.26 | $B_1$ |
|   | 23 | approx. 15,000 | 0.21 | $B_2$ |
|   | 25 | approx. 20,000 | 0.21 | $B_3$ |

Due to the high adhesive strength and the still very good solubility in the impregnating-resin-hardener system at 50° C. to 70° C., the conversion products $A_3$ and $B_3$ are preferred for further testing.

Table 2 contains the storage stability of the mixtures of three different binder/accelerator mixtures stored in thin layers in open pans.

Accelerator 1: addition product of 1 mole trimethylolpropanetriacrylate (TMPT) and 3 mole 1-methylpiperazine.

Accelerator 2: addition product of 1 mole TMPT and 3 mole 1-ethylpiperazine.

In these tests, the accelerators were dissolved in the binders $A_3$ and $B_3$, while being heated (at 70° C.) or with the help of $MeCl_2$ as solute.

TABLE 2

| | | | | Viscosity (mPas) of the mixture at 70° C. after storage at 70° C. | | | |
|---|---|---|---|---|---|---|---|
| I | II | III | $IV^1$ | 1 week | 2 week | 3 week | 4 week |
| $A_3$ | 1 | 10 | 13,000 | 90,000 | 310,000 | at 70° C. no longer measurable, however not gelatinized | |
| $A_3$ | 2 | 15 | 10,000 | 14,500 | 19,000 | 29,000 | 33,000 after |

TABLE 2-continued

| | | | | Viscosity (mPas) of the mixture at 70° C. after storage at 70° C. | | | | |
|---|---|---|---|---|---|---|---|---|
| I | II | III | IV[1] | 1 week | 2 week | 3 week | 4 week | |
| B₃ | 2 | 15 | 12,000 | 15,000 | 16,000 | 18,000 | 19,000 | 10 weeks about 300,000 after 10 weeks about 300,000 |

[1]"IV" means initial value.
In Table 2,
column I contains the symbol of the binder;
column II contains the symbol of the accelerator and
column III contains the parts by weight of the accelerator to 100 parts by weight of the binder.

Compared to the addition product of 1 mole trimethylpropanetriacrylate and 3 mole 1-methylpiperazine (accelerator 1), in the temperature range of about 70° C., the corresponding addition product of I-ethylpiperazine shows obviously the lower catalytic activity relative to the ionic polymerization of the binder resin.

Table 3 shows the excellent acceleration effect these substances have as a binder/accelerator mixture on epoxy-resin/acid-anhydride systems. The tests were performed with an epoxy-resin acid-anhydride system from a glycidylether of bisphenol A (epoxide equivalent 174±2) and methylhexahydrophthalic-anhydride.

TABLE 3

| | | Gel time in minutes of the epoxy-resin acid-anhydride accelerator mixture | |
|---|---|---|---|
| I | II | 70° C. | 90° C. |
| A₃ 1 | 22 | 100 | 26 |
| A₃ 2 | 23 | 125 | 28 |
| B₃ 2 | 23 | 130 | 30 |

In Table 3,
column I shows the binder/accelerator mixture;
column II shows the parts by weight of the binder-accelerator mixture to 100 parts by weight of the epoxy-resin acid-anhydride system.

Compared to "1-ethyl-piperazine adduct", the "1-methylpiperazine adduct" shows the higher reactivity too, the difference in the acceleration effect on the impregnating-resin system is less than it is in the case of the catalytic effect of the corresponding binder mixture (see Table 2). Therefore, if we consider the two important properties, such as the storage stability of the binder/accelerator mixture and the accelerator effect on the impregnating-resin system together, then, especially, the ethyl-piperazine adduct shows the desired properties.

Table 4 includes information on the storage stability of binder/accelerator mixtures consisting of 10 parts by weight of accelerator 2 (reaction product of 1 mole TMPT and 3 mole 1-ethylpiperazine) and 100 parts by weight of binder A₃ (see Table 1), to which two specific curing agents have been added, namely 1=2phenyl-4.5 dihydroxymethylimidazole or 2 - 1cyanoethyl-2-phenylimidazole-trimellitate.

TABLE 4

| | | Storage stability of the mixtures in days at | | Gel time at |
|---|---|---|---|---|
| I | II | RT[2] | 70° C. | 130 C. (h) |
| 1 | 3 | 150 | 10 | approx. 16 |
| 2 | 3 | 150 | 8 | approx. 12 |

[2]RT = room temperature.
In this Table 4,
column I shows the specific curing agents which are used and
column II shows the parts by weight of these curing agents per 100 parts by weight of binder/accelerator mixture.

The less reactivity of these admixtures with the binder/accelerator mixture up to the temperature range of 70° C. is evident. As a whole, the comparison to Table 2 shows somewhat higher reactivity, but at ambient temperature, the excellent stability of the mixtures is given too.

By raising the glass transition temperature of the binder by about 30° C., a further increase of the stiffness of the insulating sleeve wound with the tapes and its mechanical strength at high temperatures is obtained.

Figure 2:
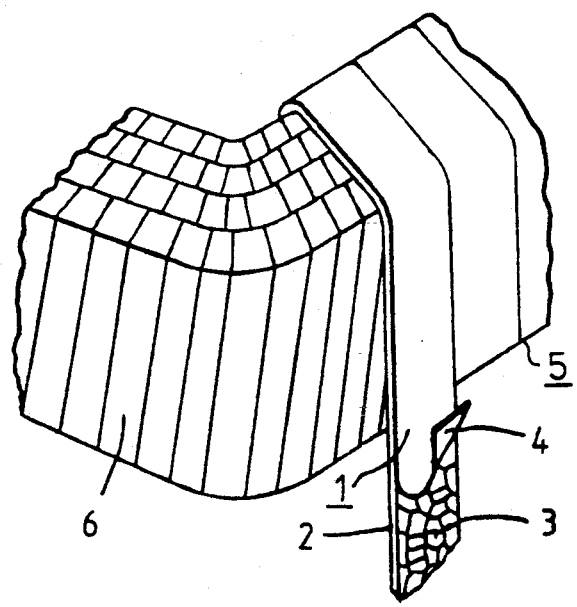
Figure 3:
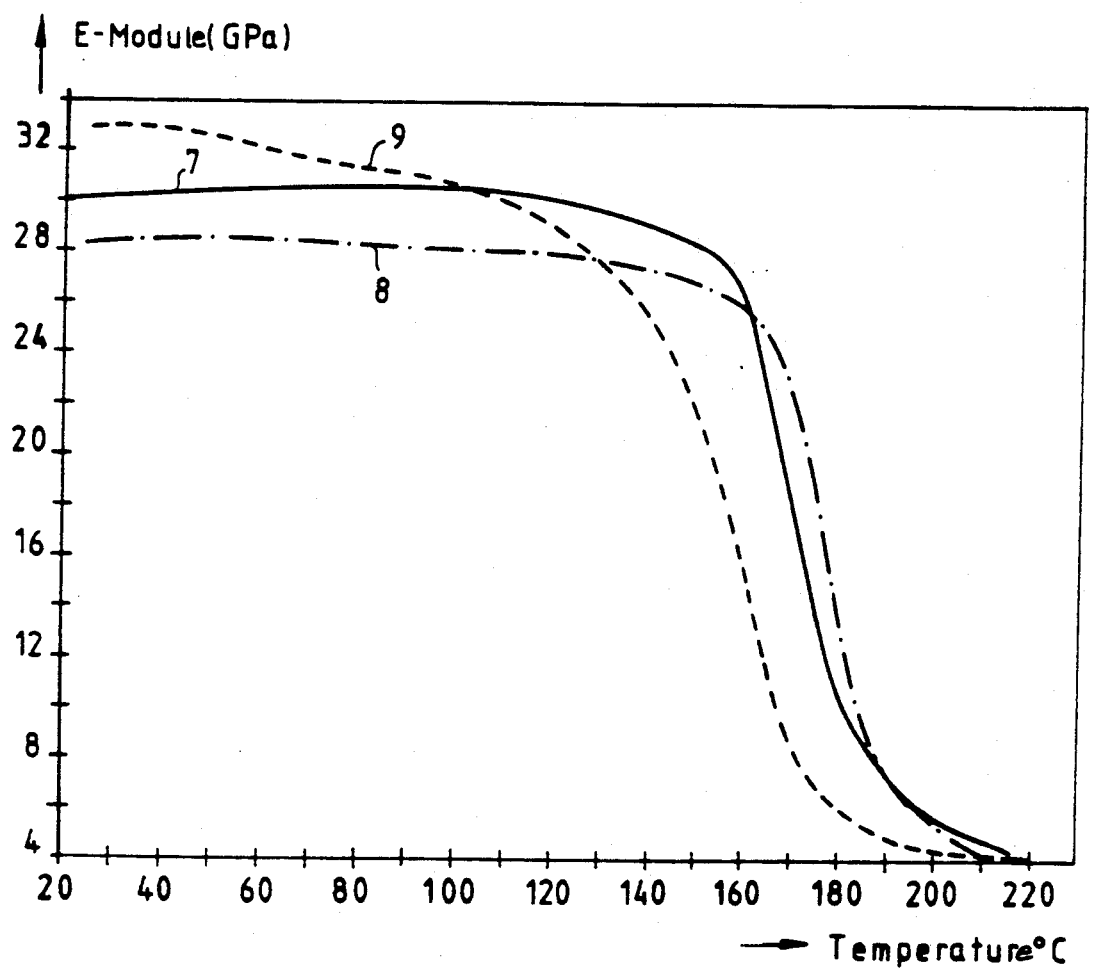

To explain the invention further, an insulating tape manufactured according to the invention is schematically shown in FIGS. 1 and 2 of the drawing. FIG. 3 of the drawing shows the stiffness of insulating sleeves using the insulating tape, and after being impregnated and cured, as a function of temperature.

The insulating tape 1 consists of a flexible support 2, of a glass cloth. For this purpose however, synthetic fabrics, synthetic material or also plastic films, particularly those with high heat resistance, can also be used. The layer of mica splittings 3 is applied to the support 2. To fix the support 2 to the layer 3, an accelerator-containing binder is used which consists of the binder A₃ (see Table 1) and of the reaction product of 1 mole TMPT and 3 mole 1-ethylpiperazine as accelerator. As layer 3, instead of the described mica splittings, mica paper or glass flakes can also be applied to the support 2 by the accelerator-containing binder. Layer 3 is sealed by a facing 4. Materials used for this facing 4 may be identical to the support 2; but other flexible materials can be used too. An insulating tape 1 manufactured in this manner can be stored for more than three months at 25° C.

To manufacture the insulating sleeve 5, the conductor of an electrical machine, for example a bar or, the coil 6, as shown in FIG. 2, which is only taped with the strand insulation, is taped overlapped with the insulating tape 1, as indicated in FIG. 2. The number of the tape layers is dependent on the desired thickness of the insulating sleeve 5. According to VPI technology, the coil 6 with the insulating sleeve 5 is then impregnated with an epoxy-resin/acid-anhydride system and subsequently cured.

To test the mechanical stiffness of an insulating sleeve 5, as a function of temperature, shown in FIG. 3, a test piece was made of about 2 mm thick. The test piece consisted of 12 layers of a 100 u thick mica paper, cemented to a glass cloth having a surface density of about 28 g/cm², by the binder/accelerator mixture bisphenol A-epoxy-resin-methylhexahydrophthalacidanhydride impregnation-mixture at approx. 70° C. The specimen was cured 24 hours at 140° C.

The temperature in °C. is plotted on the abscissa of FIG. 3, and the mechanical stiffness, that is the E-module, is plotted in gigapascal (GPa) [billion pascals] on the ordinate axis.

The graph 7 shows the stiffness of an insulating sleeve, using a mica tape, known from the German Patent 21 42 571.

The graphs 8 and 9 illustrate the stiffness of insulating sleeves wound using mica tapes with binder/accelerator mixtures according to the present invention. The insulating sleeve represented by the graph 8 contains the binder $A_3$ (see Table 1) and the insulating sleeve represented by the graph 9 contains the binder $B_3$. In both cases, the reaction product of 1 mole TMPT and 3 mole 1-ethylpiperazine was used as an accelerator.

As expected, the graphs 7 and 8 show a high level of thermal stiffness of the corresponding insulating sleeves, while this high level is not fully attained in graph 9, due to the flexibilizing effect of the structure of the adipic acid residue of the binder.

We claim:

1. An insulating tape comprising
a flexible support;
a flat, inorganic material of high dielectric strength selected from the group consisting of mica splittings and mica flakes, deposited on the flexible support and bonded to the support and to each other by means of a binder containing an accelerator which promotes the curing reaction of an impregnating resin, wherein the binder accelerator mixture forms a system that is self-curing at the curing temperature of the impregnating resin, and wherein the binder comprises a physiologically innocuous, ring-epoxidized, cycloaliphatic epoxy resin, modified by molecular enhancement, to an epoxide equivalent greater than 200 and wherein the accelerator is an adduct of a (meth)acrylate compound and a piperazine selected from the group consisting of 1-methyl-piperazine and 1-ethyl-piperazine.

2. The insulating tape according to claim 1 wherein the binder is bis(3,4-epoxycyclohexylmethyl) adipate modified by molecular enhancement to an epoxide equivalent greater than 300.

3. The insulating tape according to claim 1 wherein the binder is 3,4-epoxycyclohexylmethyl-(3,4 epoxy) cyclohexanecarboxylate modified by molecular enhancement to an epoxide equivalent greater than 200.

4. The insulating tape according to claim 1 wherein the molecular enhancement of the binder is the result of a reaction with bisphenol A according to an advancement process.

5. The insulating tape according to claim 1, wherein the accelerator is the reaction product consisting of 1 mole trimethylolpropanetriacrylate and 3 mole of 1-ethyl-piperazine.

6. The insulating tape according to claim 1, wherein the accelerator is the reaction product consisting of 1 mole trimethylolpropanetriacrylate and 3 mole of 1-methyl-piperazine.

7. The insulating tape according to claim 1, wherein the binder/accelerator mixture contains admixtures acting as hardeners, which only become effective at the curing temperatures of the impregnating resin.

8. The insulating tape according to claim 7, wherein 2-phenyl-4,5 dihydroxymethylimidazole is present as a component in the binder/accelerator mixture.

9. The insulating tape according to claim 7, wherein 1-cyanoethyl-2-methylimidazoletrimellitate is present in the binder/accelerator mixture.

10. The insulating tape according to claim 1, wherein the percentage by weight of the binder is between 3 to 20% of the total weight of the insulating tape.

11. The insulating tape according to claim 1, wherein the percentage by weight of the accelerator is about 0.05 to 3% of the total weight of the insulating tape.

12. The insulating tape according to claim 1, wherein curing agents are present in the binder/accelerator mixture in an amount from 0.05 to 10% by weight in regard to the total weight of the binder.

13. The insulating tape according to claim 1 wherein the binder additionally joins a facing of the tape.

* * * * *